(12) United States Patent
Dutta et al.

(10) Patent No.: US 10,148,519 B2
(45) Date of Patent: Dec. 4, 2018

(54) AUTOMATION NETWORK TOPOLOGY DETERMINATION FOR C AND I SYSTEMS

(71) Applicant: Honeywell International Inc., Morris Plains, NJ (US)

(72) Inventors: Manas Dutta, Karnataka (IN); Ramakrishnan Ganapathi, Karnataka (IN); Abhishek Nikhra, Karnataka (IN); Praveen Shetty, Karnataka (IN); Jaganmohan Y. Reddy, Andhra Pradesh (IN)

(73) Assignee: Honeywell International Inc., Morris Plains, NJ (US)

( * ) Notice: Subject to any disclaimer, the term of this patent is extended or adjusted under 35 U.S.C. 154(b) by 244 days.

(21) Appl. No.: 15/177,895

(22) Filed: Jun. 9, 2016

(65) Prior Publication Data
US 2017/0359222 A1 Dec. 14, 2017

(51) Int. Cl.
*H04L 12/24* (2006.01)
*H04L 29/12* (2006.01)
*H04L 12/26* (2006.01)

(52) U.S. Cl.
CPC .............. *H04L 41/12* (2013.01); *H04L 41/22* (2013.01); *H04L 43/0811* (2013.01); *H04L 61/103* (2013.01); *H04L 61/6022* (2013.01)

(58) Field of Classification Search
CPC ..... H04L 41/12; H04L 43/0811; H04L 41/22; H04L 61/6022; H04L 61/103
See application file for complete search history.

(56) References Cited

U.S. PATENT DOCUMENTS

| | | | |
|---|---|---|---|
| 6,970,919 B1 * | 11/2005 | Doi | H04L 41/0631 345/440 |
| 9,893,940 B1 * | 2/2018 | Chawla | H04L 41/082 |
| 2003/0046390 A1 | 3/2003 | Ball et al. | |
| 2004/0024573 A1 * | 2/2004 | Allen | H04L 41/12 702/189 |
| 2006/0101340 A1 | 5/2006 | Sridhar et al. | |
| 2007/0101422 A1 * | 5/2007 | Carpenter | H04L 63/02 726/13 |
| 2007/0208840 A1 | 9/2007 | McConville et al. | |
| 2008/0228908 A1 * | 9/2008 | Link | H04L 41/046 709/223 |
| 2009/0285127 A1 | 11/2009 | Black et al. | |
| 2010/0315975 A1 * | 12/2010 | Arkin | H04L 12/413 370/254 |
| 2012/0147782 A1 * | 6/2012 | Puthenpura | H04W 40/24 370/254 |
| 2015/0156072 A1 | 6/2015 | Kirrmann | |
| 2017/0085447 A1 * | 3/2017 | Chen | G06F 17/30554 |

* cited by examiner

*Primary Examiner* — Charles C Jiang
*Assistant Examiner* — Thad N Defauw
(74) *Attorney, Agent, or Firm* — Anthony Miologos (57) ABSTRACT

A method of automatic network topology determination for at least one Control & Instrumentation (C&I) system in an industrial facility. A network type, and all nodes and interconnecting networking devices including switches in the C&I system(s) are discovered. Additional connectivity information including a connection of the nodes to a specific port is collected. The network relationships of the nodes and interconnecting networking devices in the C&I system are determined. A network topology diagram of the C&I system is automatically generated from the nodes and interconnecting networking devices, additional connectivity information, and network relationships.

16 Claims, 4 Drawing Sheets

AUTOMATION NETWORK TOPOLOGY DETERMINATION FOR C AND I SYSTEMS

FIELD

Disclosed embodiments relate to determining the network topology of control & instrumentation systems in an industrial facility such as a manufacturing plant or refinery.

BACKGROUND

A manufacturing plant or refinery (an "industrial facility", or "IF") may have several Control & Instrumentation (C&I) systems including one or more distributed control system (DCSs) or Programmable Logic Controller (PLCs) are a combination of complex software and hardware used for monitoring and controlling process parameters in industries including pressure, temperature, and flow. Such IF are widely used in industries such as petroleum refineries, paper and pulp, and power plants. Most IF work on an Ethernet topology. Ethernet refers to the family of computer networking technologies covered by the IEEE 802.3 standard, and can be run over both optical fiber and twisted-pair cables.

In modern plant engineering, the C&I devices link all plant components. The C&I devices include I/O modules that generally receive physical parametric (e.g., pressure, temperature) representations from sensors as standard current signals (4 mA to 20 mA). These signals are utilized by other various C&I devices including for regulating, safety, data acquisition and comparator systems for control, safety and instrumentation purposes. Specifically, conventionally various comparators compare the incoming 4-20 mA signals received from sensors against stored/set "set points" and create outputs used for plant safety, regulation, interlock or/and operation.

The IF generally comprises components including server and clients (computers with operating systems such as WINDOWS/UNIX/Linux), and embedded nodes acting as controllers or gateways. All these C&I system components have their own IP address and communicate with each other typically using Ethernet-based protocols. In a typical IF setup, there could be hundreds of such system components (server, client, embedded nodes) connected through various network switches, routers etc., and the types and numbers of such system components differ from customer to customer.

There is no known automated way to enable discovery of all the nodes present in the C&I of the IF so that a complete network topology for any of the C&I systems or for the entire IF cannot be drawn. Accordingly, a project engineer manually draws the network topology referring to the actual connectivity of the C&I system components and hands over the static network topology document generated to the plant maintenance engineer post commissioning of the plant.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize problems with conventional static network topology and instrument connection drawings for control & instrumentation (C&I) systems in an industrial facility (IF, or a "plant") include such drawings being a labor-intensive job for project engineers to create a detailed system network topology drawing and instrument loop drawing for each setup because each topology drawing is created manually. As used herein a C&I system and a control system are synonymous. Moreover, maintenance of such topology drawings is also a labor-intensive task because every change made in the setup needs to be tracked and updated without error. Moreover, if the network topology drawing is not detailed enough, trouble shooting problems in the C&I system or the IF becomes difficult.

For example, if any particular network node (e.g., embedded controller, embedded gateway modules for open fieldbus protocols such as Foundation Fieldbus, and Profibus) is getting disconnected frequently, to troubleshoot an issue that may arise, the maintenance engineer first tries to identify the port where the node is connected. A connection is defined by two endpoints. As used herein and used in networking, a "node" is end device connected to a switch or other intermediate located (non-endpoint) networking equipment such as a router, hub or firewall, whereas a "port" is the specific place where the end device/node gets connected to (to the networking equipment). An endpoint is defined by the combination of a network address (e.g., IP address) and a port identifier. A port is thus a physical entity in the network and is generally part of physical switch or a hub. For example, a practical physical switch or hub may have many ports (e.g., 24 ports, or 48 ports). End nodes (e.g., computers) are connected to individual ports, such as by Ethernet cables.

If the network topology drawing it is not documented properly, it becomes a difficult job to identify the proper port where the node is connected to start a debugging process. In a large control network comprising hundreds of nodes and network equipment, it is difficult to quickly find one particular node and identify the connectivity of that node in detail. After locating one targeted node in a network topology, if the user wants to quickly know where this particular node is physically located, a manually created static network view does not show that needed detail. When there is multiple networking equipment being used between two nodes, it is difficult to trace the complete network path with the port number, uplink/downlink connection details, and cable type in such a conventional static network view.

Disclosed embodiments solve this problem by including automatic network topology determination for C&I system(s) or the entire IF comprising plurality of C&I systems which discovers all the nodes and interconnecting networking devices in the C&I system(s), without any need for human intervention. Additional engineering configuration information is then collected from all the nodes and networking devices to determine the connectivity and signal flow between the nodes, where signal flow in this context means data flow from one function block to another function block between one or across different nodes. Network relationships are established, and a complete network topology diagram of at least one C&I system(s) or the entire IF is then automatically obtained. The complete network topology diagram is highly useful as it provides a full view of control network(s) in the IF with the networking devices and the signal flow shown. The network topology diagram can be used to perform impact assessment or resolve network issues including in the case of overloading/packet loss or a network outage.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Figure 1:
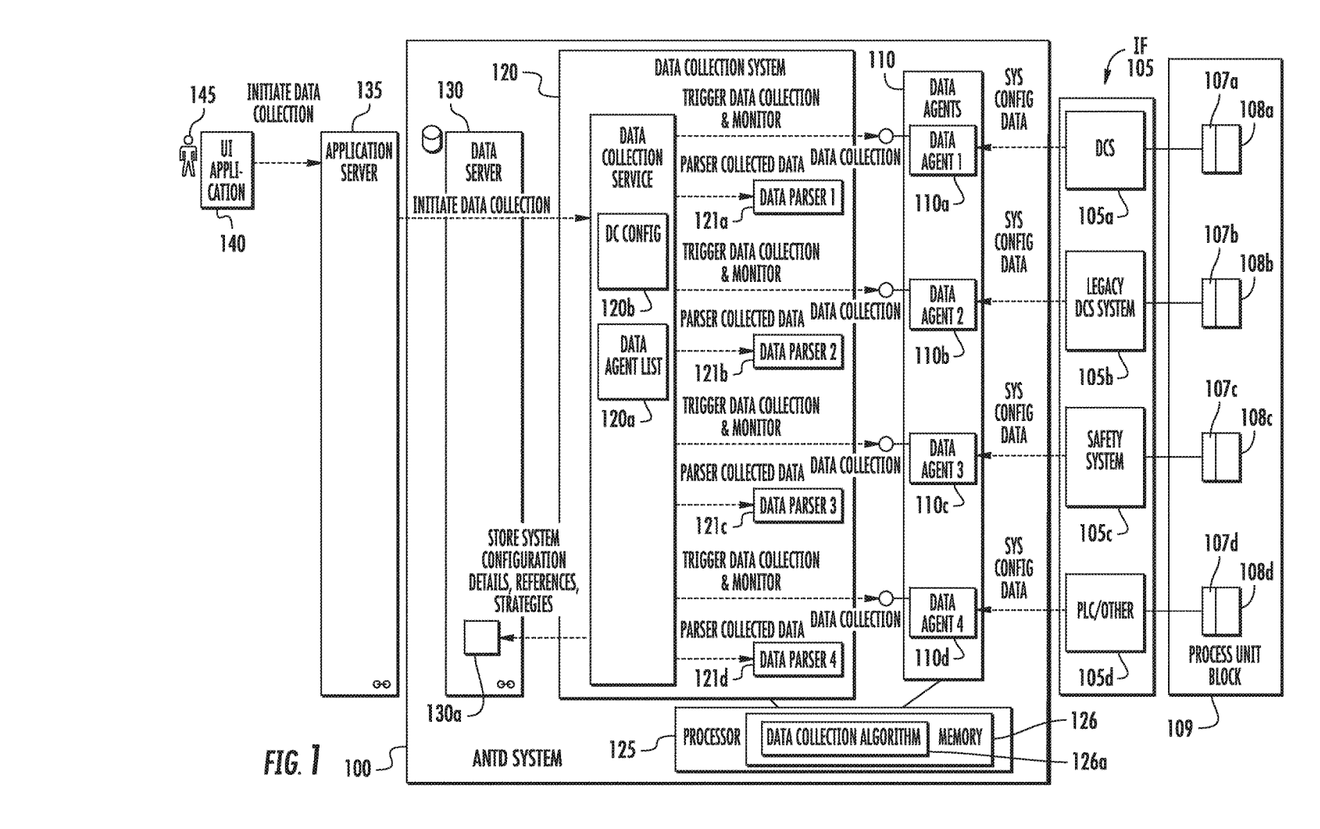
FIG. 1 shows an example automatic network topology determination (ANTD) system for automatically discovering all the nodes present and their interconnection in an at least one C&I system(s) or the entire IF for automatically determining the network topology, according to an example embodiment.

FIG. 1 shows an example ANTD system 100 for automatically determining all the nodes present in an at least one C&I system(s) or the entire network topology of an IF 105. IF 105 comprises the blocks shown in FIG. 1 including the application server 135, data server 130, C&I systems 105a-d, and the process unit block 109 controlled by the C&I systems 105a-d, as well as many other elements within the IF that are not shown. The C&I systems shown comprise a first DCS 105a, a legacy DCS 105b, a safety system 105c (including safety controllers, and network interface modules (NIMs)), and Programmable Logic Controller (PLC) or other controller 105d which are each referred to herein as being C&I systems. As known in the art, the DCS and PLC each include at least one process controller, at least one input/output (I/O) module, and a plurality of field devices (actuators and sensors) connected to processing equipment in the plant configured for implementing an industrial process. A PLC is generally used for control of small package items such as compressor, and pumps. A PLC comprises a PLC controller along with related TO modules.

The process unit block 109 is shown including processing equipment 108a, 108b, 108c and 108d (boilers, compressors, and pumps) configured for implementing an industrial process, a plurality of field devices (actuators and sensors, such as for sensing temperature and pressure) shown as 107a, 107b, 107c and 107d coupled to the C&I systems 105a, 105b, 105c and 105d. As noted above, the C&I system devices include I/O modules that generally receive physical parametric (e.g., pressure, temperature) representations from sensors, and other C&I devices use these representations for regulating, safety, data acquisition and comparator systems for control, safety and instrumentation purposes.

ANTD system 100 includes a data agents block 110 shown including data agent 1 110a, data agent 2 110b, data agent 3 110c and data agent 4 110d, each shown receiving system configuration data including the network type and communicating method used from the first DCS 105a, legacy DCS 105b, safety system 105c, and PLC or other controller 105d, respectively. The respective data agents (110a, 110b, 110c and 110d) each thus have the knowledge of the IF 105 that they are associated with from which the network topology needs to be collected including the network type (e.g., Ethernet, fault tolerant Ethernet (FTE), a Local Control Network (LCN) or a wireless network) and the communication method used by the C&I system.

The ANTD system 100 receives some basic configuration information from end users (called "data collection settings") regarding the nodes and interconnections in the respective C&I systems 105a, 105b, 105c, 105d which is utilized by their respective data agents (110a, 110b, 110c and 110d). For example, data collection settings can include the cluster name, the server name for a server within the respective C&I systems (e.g., a server under the DCS 105a), the IP address of the remote node that acts as a data agent, and username and password to access the network topology drawing and details generated by the ANTD system 100. The data agents (110a, 110b, 110c and 110d) are at nodes where data collection system 120 runs, extracts engineering configuration information from a server in the their associated C&I system (105a-105d) and pushes the engineering configuration data back to the data server 130.

Using formation from the data collection setting, when prompted by the user 145 the ANTD system 100 will initiate collecting configuration data. In case of EXPERION the communication method is star based FTE, in case of TPS/Protocol Conversion Application (PCA) it is physical bus/logical ring token pass communication. The data agents 110a, 110b, 110c and 110d in the data agents block 110 are responsible for discovering the respective nodes in the network and the interconnection of the nodes in the C&I system that they are associated with.

Each C&I system (DCS 105a, legacy DCS 105b, safety system 105c, and PLC or other controller 105d) may employ one or more network types which can be standard networks such as Ethernet or be propriety networks. Therefore disclosed data agents 110a-110d may use different discovery methods for different C&I systems (e.g., one method for the DCS 105a or 105b and another method for PLC or other controller 105d) and for different network types. Data agents block 110 is remotely executed by the user 145 (such as from a control room or in satellite rack room (SRR)) in the IF 105. The data agents block 110 is generally developed in a technology that is compatible with the technology platform as C&I systems might be running on a different operating system (OS) such as LINUX, UNIX, etc., so the data agents 110a-110d can be compatible with technology platform (e.g., OS) of their associated C&I system.

New data agents for the data agents block 110 can be developed and deployed to support the release of a new C&I system. ANTD system 100 also includes a data collection system 120. The data collection system 120 is responsible for starting and tracking the actual data collection service activity from the C&I system(s) 105a-105d provided by the data agents block 110. Internally, the data collection system 120 uses a data agent list 120a which comprises a stored list of all the data agents which are registered with data collection system 120 that includes which data agent is applicable for each of the listed C&I systems (105a-105d) along with the version of the C&I system. Data collection system 120 includes data collection (DC) configuration block 120b which stores a list of the C&I systems from which configuration data needs to be collected, connectivity information to be used to connect to the C&I system, and credentials to be used by the data agents in data agents block 110 to obtain access to the C&I system's engineering configuration data.

For each C&I system 105a-105d in the IF 105 the data collection system 120 starts the respective data agent 110a-110d in the data agents block 110. Data collection system 120 orchestrates the data agents 110a-110d and monitors their progress. Data collection system 120 starts a data parser (121a, 121b, 121c, 121d) after the respective data agents 110a, 110b, 110c, 110d) have collected data that they receive from their associated C&I system 105a-105d.

The data collection system 120 and data agents block 110 are both generally implemented with a processor 125 having associated memory 126 with data storage capacity that stores a disclosed data collection algorithm 126a run by the processor 125. The processor can comprise a microprocessor, digital signal processor (DSP), or microcontroller unit (MCU). The output of the data parsers 121a-121d which is in a common generic format is stored in a memory 130a of the data server 130. The user 145 is shown at a user interface (UI) application 140 (such as in a control room) which upon an input by the user initiates a data collection request to the application server 135 which forwards the data collection request to the data collection system 120.

The common generic format stored in the memory 130a has representation for objects, connections and associations found in ICSs. Objects have attributes that identify and describe them. Objects can be physical entities such as controllers, PLCs, chassis, racks, I/Os, servers, workstations or switches. Another set of objects is logical entities such as installed application, control logic, batch control, ladder logic, safety logic, history references or HMI references. The objects can be connected to exchange data and control, and these are represented by connections. The connections represent a physical connection or a logical connection between two objects. A network connection between a controller and a server is an example of a physical connection. Connection between two control logic to exchange data represents logical connection. The common generic format to store engineering configuration enables a single information source being used to store data collected from different industrial C&I systems. Additionally, a common generic format can be applied across C&I systems leading to uniform engineering and maintenance practices.

The data server 130 represents the information system which stores the engineering configuration data collected from the various C&I system(s) 105a-105d shown in the IF 105. The data server 130 guarantees the atomicity, consistency, isolation and durability of collected network topology snapshot data. In case of any failure, changes made for the snapshot can be rolled back. Therefore the data server 130 guarantees that either all snapshot data will be inserted or nothing will be inserted. Data server 130 provides necessary interfaces that can be used by the application server 135 to access this data. (Also see FIG. 3 described below).

ANTD system 100 includes a communication mechanism between the data collection service of the data collection system 120 and the data agents 110a-110d of the data agents block 110 that is generally not fixed. The data collection service may use a different communication mechanism (such as Simple Network Management Protocol (SNMP), or Windows Management Instrumentation (WMI)) to invoke and control different data agents 110a-110d. The communication mechanism utilized depends on the platform of the target CM system and the technology in which data agent 110a-110d is developed.

Figure 2A:
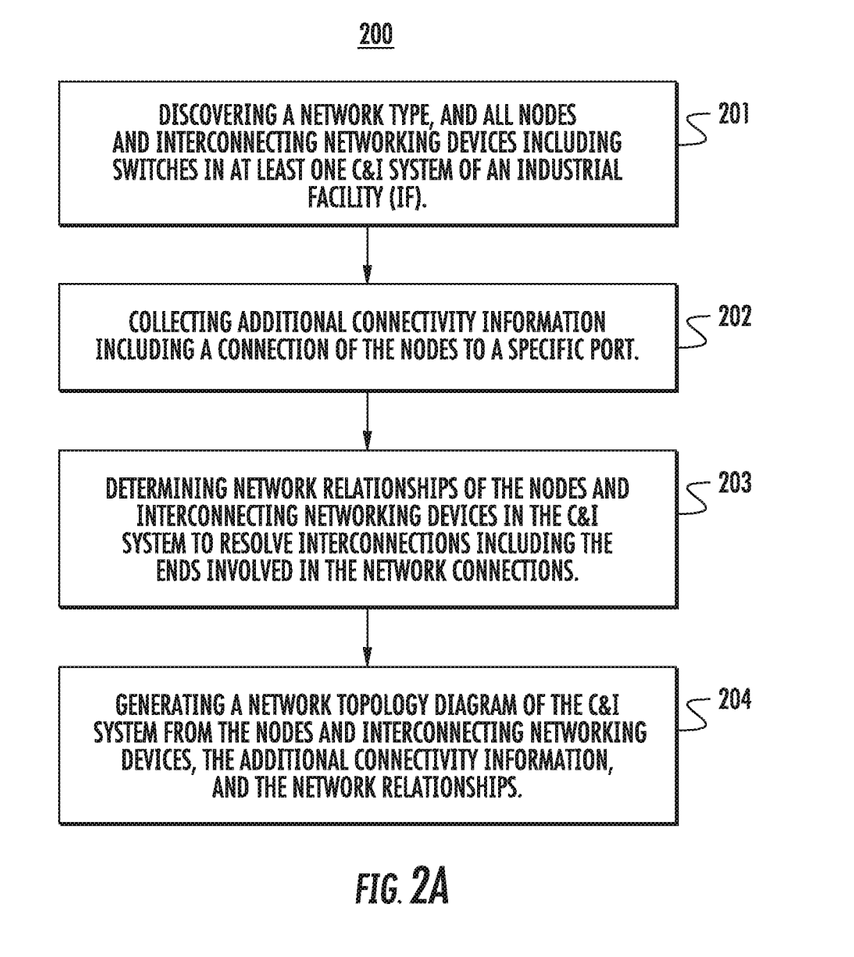
FIG. 2A is a flow chart for an example method of automatic network topology determination for at least one C&I system in an IF, according to an example embodiment.

The data agents block 110 can use the following steps described below relative to method 200 to discover and store the network topology including all the nodes present and their interconnection for any target C&I system (say DCS 105a) in the IF 105, or for all C&I systems in IF 105. FIG. 2A is a flow chart for an example method 200 of network topology determination for at least one C&I system in an IF, according to an example embodiment.

Step 201 comprises automatically discovering a network type, and all nodes and interconnecting networking devices including switches in the C&I system. As used herein, "switches" include any network switching device including hubs and routers. This discovery network step is the first step where the data agent 110a-d discovers the network type (such as Ethernet, fault Tolerant Ethernet (FTE), Local Control Network (LCN), Universal Control Network UCN)) and all the elements (interconnecting and switches) and nodes that are connected to the network of the C&I system it is associated with. For different C&I systems the discovery approach will generally be different.

For example, EXPERION information can be extracted from databases referred to as EMDB and ERDB of the C&I systems (that are generally stored in a memory of a server in the respective C&I systems) at a server node, and then a query of those devices based on the list of devices extracted from the server enables further information to be obtained that generally differs from node to node. For switches, one will generally query the switches' Media Access Control (MAC) address table and configuration details. Elements include interconnecting devices (such as Control Firewalls (CF9), Network Interface Module (NIMs)) and switching devices. If the C&I system comprises multiple different networks (e.g., a combination of FTE and LCN/UCN) then that network information can also be discovered at this step.

Step 202 comprises collecting additional connectivity information including a connection of the nodes to a specific port. A given node may be involved in more than one network connection using a different network type and communication protocol. In this step the network connections are identified for all the nodes discovered in the discover network step. For each network connection the ANTD system 100 identifies all the connection information needed. This information can be obtained from the MAC address table data stored at a switch in the C&I system, or Address Resolution Protocol (ARP) table data stored at a server in the C&I systems which can be used to identify the ends involved in any connection. The MAC addresses are physical machine addresses, and the ARP data maps an Internet Protocol address (IP address) to a physical machine address that is recognized in the local network. A table, generally called the ARP cache, typically stored in the memory of a server computer in the C&I systems is used to maintain a correlation between each MAC address and its corresponding IP address.

Step 203 comprises determining network relationships of the nodes and interconnecting networking devices in the C&I system to resolve interconnections including the ends involved in the network connections. For example, from a switch one can obtain port to MAC address mapping. From an ARP table stored at a server in each of the C&I systems one can obtain IP to MAC address mapping in the respective C&I systems. Combining these two items, one can determine which device IP is connected to which port. Then from the engineering database it can be determined the node type and node name details for those IP addresses which would be used to draw the network topology with all the details including which node of which type with what IP address is connected to which port of which switch as there can be many switches present in the network.

Step 204 comprises generating a complete network topology diagram (or view) of the C&I system from the nodes and interconnecting networking devices, the additional connectivity information, and the network relationships. As used herein, a "complete" network topology diagram refers to a diagrammatic view of the C&I system network including all of its nodes (computer and embedded) present in the network, its intermediate networking equipment such as switches, network cables used to connect the nodes, and signal flow all in one drawing. The topology drawing can have different network type representations for Ethernet, Bus or wireless network (e.g., different icons for different network types). This step also marks ports that are used and unused in a networking or a switching device. A network topology view prepared for the C&I system of interest of the IF is generally finally saved as a database (e.g., in the memory 130a of the data server 130) for later display on a display device for viewing by a user.

Figure 2B:
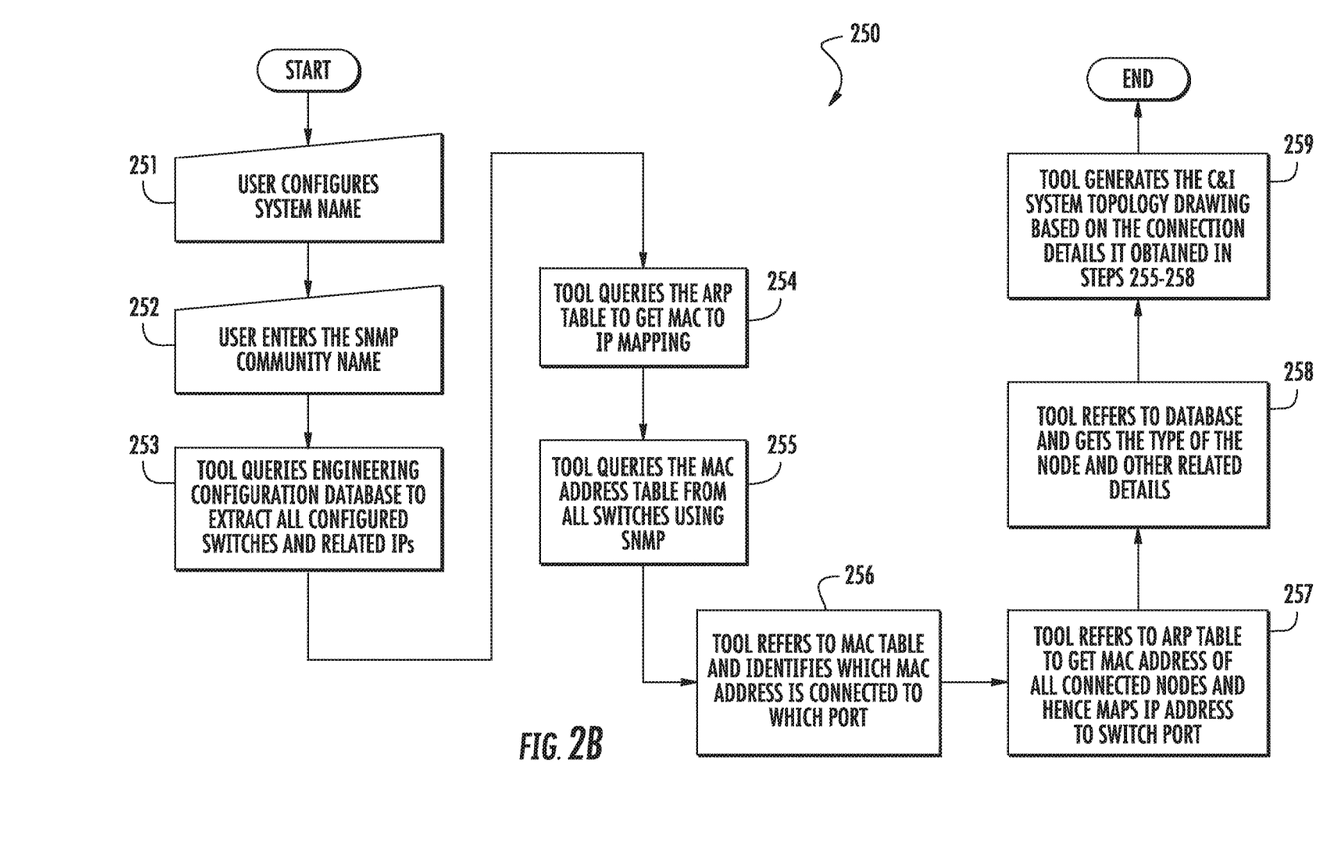
FIG. 2B is another flow chart that shows steps in an example method of ANTD that automatically generates a network topology drawing for at least one C&I system of an IF, according to another example embodiment.

FIG. 2B is a flow chart 250 that shows steps in a more detailed example method of ANTD that automatically generates a network topology drawing for at least one C&I system of an IF, according to an example embodiment. The ANTD system 100 is referred to as a "tool" in FIG. 2B. Steps 251 to 259 are shown. Step 251 comprises the user' configuring a system name to indicate what the network topology to be drawn is for which C&I system(s) as there could be multiple CM systems present in the IF (e.g., plant) and the user may want to generate a separate network topology drawing for each C&I system. Step 252 comprises the user entering a Simple Network Management Protocol (SMNP) community name generally needed to "talk" to networking devices such as switches to allow talking over SNMP protocol to enable extracting engineering configuration details from the networking devices (e.g., switches). SNMP as known in the art is an Internet-standard protocol for collecting and organizing information about managed devices on IP networks and for modifying that information to change device behavior. Devices that typically support SNMP include routers, switches, servers, workstations, printers, and modem racks.

Step 253 comprises the tool querying an engineering configuration database that as described above is generally stored in EMDB and ERDB databases at a memory at a server in the C&I system to extract all configured switches and related IP addresses which are unique to each device, for example 10.1.1.25 for a particular switch. Step 254 comprises the tool querying the ARP table data (typically stored at the servers in the respective C&I systems) to obtain the MAC addresses and their corresponding IP address (to provide IP to MAC address mapping. Step 255 comprises the tool querying the MAC address table from all switches using SNMP to obtain the MAC address information in the MAC table. Step 256 comprises the tool referring to the MAC table to identify which MAC address is connected to which port.

Step 257 comprises the tool referring to the ARP table to obtain a MAC address of all connected nodes and hence a mapping of IP addresses to switch ports. Step 258 comprises the tool referring to the engineering database present in a server in the C&I systems to obtain the type of the node (such as a process controller, and gateway module) and other related details (such as the name of the node configured in engineering database). Step 259 comprises the tool automatically generating a system topology drawing for at least one C&I system based on connection details acquired in steps 255-258 described above.

Figure 3:
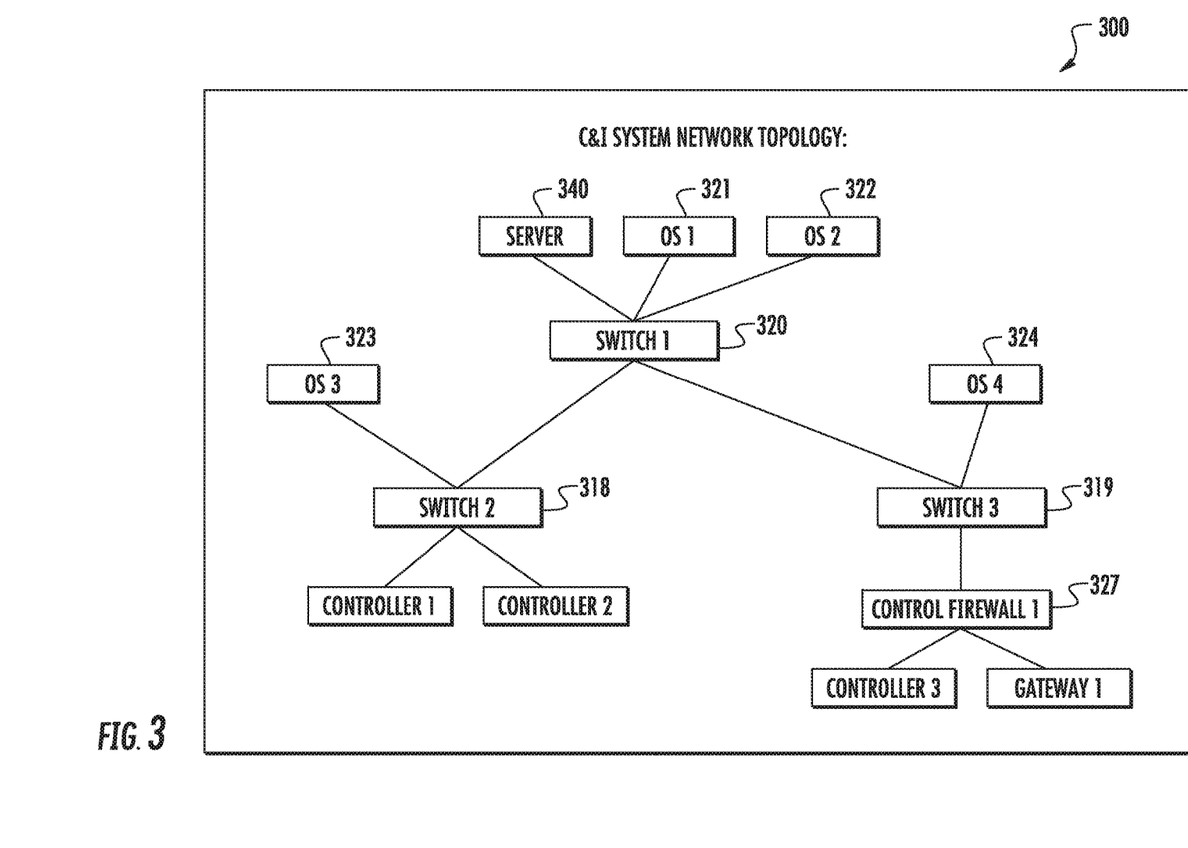
FIG. 3 shows a simplified example C&I system network topology drawing that can be automatically generated by a disclosed ANTD system.

FIG. 3 shows a simplified example C&I network topology drawing 300 that can be determined by a disclosed ANTD system 100 which automatically discovers all the nodes present in C&I system and connection details (including signal flow) between the nodes to automatically determine the network topology drawing 300. C&I network topology drawing 300 includes the network type, all its nodes and interconnecting networking devices, connectivity information including network relationships between the nodes and the interconnecting networking devices.

Although only one C&I system is shown in FIG. 3, there may be multiple C&I systems in the same IF network. Although not shown in FIG. 3, coupled to the controllers in the C&I system is a process unit block (such as shown in FIG. 1) that includes processing equipment (e.g., boilers, compressors, and pumps) configured for implementing an industrial process, field devices (actuators and sensors, such as for sensing temperature and pressure). The interconnecting networking devices in FIG. 3 include switches 318, 319 and 320 and control firewall 327.

Switches 318, 319 and 320 are shown coupled to a server 340 for the CM system that includes a memory which stores an ARP table and the engineering configuration database. Operating systems (OS) are shown as OS1 321, OS2 322, OS3 323, and OS4 324 that are coupled by one or more switches 318, 319 and 320 to the controllers. As noted above, switches 318 and 319 and 320 have MAC tables with node and connection data utilized by a disclosed ANTD system 100 to automatically determine the C&I system network topology drawing 300.

Believed to be unique features of disclosed automation network topology determination for C&I system(s) include:
1. Automatically discovering all the nodes present in a C&I system.
2. Collection of the C&I system's all nodes related data, IP addresses, port number where the nodes are connected to, how intermediate networking devices are interconnected (e.g. switch to switch connectivity), and the populating of the collected data in a centralized system as one snapshot representing a network topology for one or more C&I system(s) at any instant in time the system snapshot was taken.
3. Provides users the option to declare confidential/proprietary data to exclude intellectual property data or trade secrets from disclosed configuration data collection using an exclusion list, such as to exclude discovery of proprietary control strategies. This ensures safeguard of confidential information often present in C&I systems.
4. Establish inter-connection details between different diversified C&I systems' nodes without any additional inputs from end users as described above. Traditionally all network drawings are static in nature and require manual user' input to populate the drawing including how many switches are there, how the switches are connected, and which node is connected to which port. With a disclosed ANTD system, without any manual input engineering configuration information is extracted sufficient to draw a network topology view.

5. Provide users the option to traverse the network connectivity through progressive disclosure. For example, after referring to a MAC table of one switch, disclosed software may discover that one MAC address is pointing to another switch connected to the current switch. Then the algorithm will allow going to the second switch, and discovering the MAC table of the second switch to understand further connectivity of that neighboring node.

6. Provide users options to select any particular node in the network view to "see" all related information of the selected node including the type of the selected object, model number, port number where that node is connected to, all the maintenance records and change record of the selected node, and any document relevant to maintenance or troubleshooting of that node.

7. Provide a search option to user to locate one particular node in the network view. This can be an option in a Web User Interface that provides a user the option to search for example one particular computer or embedded node in a large network topology drawing. For example, the user can type in computer name and the network topology will find that node in the large network topology drawing and directly zoom in to that particular view for user to quickly know where that node is located in the network, how that node is connected to the network, because in a large control network it might be difficult/time consuming to locate one particular node quickly.

8. The search option can provide a wild card search. For example, consider that an end user know a computer name starts with "operator" but does not remember the whole computer name. In that case he/she will enter "operator*" and search, the ANTD system will show a list of all the matching names such as "operatorstation1", "operatorstation2", "operatorconsole1" etc. etc. . . . whatever starts with "operator" . . . ) that can list down all the nodes/objects that matches the search string so that a user can select any one node/object from the list provided to locate that in network view.

9. Provide a user option to select one node in network view and switch to a physical view. A physical view is the view of physical location of the node. For example, a computer node shown in the network is physically located in one particular control room in the process plant. The physical view depicts those details, which nodes in the C&I system are located in which building, which cabinet, etc., to understand where that particular node is physically located (e.g., control room, satellite rack room along with the cabinet number).

10. Provide users options to select one node and then switch to a logical view to see the logical association of the selected node.

11. Provides an indication of unused ports in the networking and switching devices used in the CM system.

12. Provides different representations for different network topologies to represent differently different network types for example Ethernet, Bus or a wireless network.

Disclosed embodiments can be applied to generally a variety of industrial facilities. Example facilities include petroleum refineries, paper and pulp, and power plants.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A method of network topology determination for at least one Control & Instrumentation (C&I) system in an industrial facility (IF), comprising:

discovering a network type, and all nodes and interconnecting networking devices including switches in said IF C&I system, said IF C&I system comprising a first C&I system and a second C&I system, using at least one data agent in a data agent block and said at least one data agent comprises a first data agent and a second data agent, said first data agent compatible with a first operating system (OS) in said first C&I system, and said second data agent is compatible with a second OS used in said second C&I system that is different from said first OS;

collecting additional connectivity information including a connection of said nodes to a specific port;

determining network relationships of said nodes and said interconnecting networking devices in said IF C&I system, by obtaining port to Media Access Control (MAC) address mapping data from a MAC table stored at said switches and Address Resolution Protocol (ARP) data from an ARP table stored at a server in said IF C&I system;

determining at least one of node type and node address that including which node of which type with what IP address is connected to which port of which switch present in the network, for a network topology diagram; and generating the network topology diagram of said IF C&I system from said nodes and said interconnecting networking devices, said additional connectivity information, and said network relationships, wherein said discovering, said collecting, said determining, and said generating are all automatically implemented.

2. The method of claim 1, further comprising determining inter-connection details between said first and second C&I systems without any additional inputs from an end user.

3. The method of claim 1, further comprising protecting confidential or proprietary data to exclude intellectual property data or trade secrets from said method using an exclusion list.

4. The method of claim 1, further comprising upon choosing a selected node from said nodes, displaying related information of said selected node including an object type, model number, port number that said selected node is connected to, and maintenance records for said selected node.

5. The method of claim 1, further comprising a search option to enable a user to use said search option for locating one particular node of said nodes.

6. The method of claim 1, further comprising selecting a first node from said nodes in said network topology diagram, and responsive to said selecting switching to a physical view to determine where said first node is physically located.

7. The method of claim 1, further comprising selecting a first node from said nodes in said network topology diagram, and responsive to said selecting switching to logical view to see a logical association of said first node.

8. The method of claim 1, wherein said network topology diagram provides different representations for different network topologies present in said C&I IF system.

9. An automatic network topology determination (ANTD) system, comprising:
- a processor having associated memory which stores a data collection algorithm run by the processor for implementing a data collection system coupled to a data agent block including a data agent list which includes at least one data agent in said data agent block registered with said data collection system, said data collection system coupled to said data agent block configured to be coupled between a data server and at least one C&I system of an industrial facility (IF), said data collection algorithm:
  - discovering a network type, and all nodes and interconnecting networking devices including switches in said IF C&I system, said IF C&I system comprising a first C&I system and a second C&I system, said at least one data agent comprises a first data agent and a second data agent, said first data agent compatible with a first operating system (OS) in said first C&I system, and said second data agent is compatible with a second OS used in said second C&I system that is different from said first OS;
  - collecting additional connectivity information including a connection of said nodes to a specific port;
  - determining network relationships of said nodes and said interconnecting networking devices in said IF C&I system, by obtaining port to Media Access Control (MAC) address mapping data from a MAC table stored at said switches and Address Resolution Protocol (ARP) data from an ARP table stored at a server in said IF C&I system;
  - determining at least one of node type and node address that including which node of which type with what IP address is connected to which port of which switch present in the network, for a network topology diagram; and
  - generating the network topology diagram of said IF C&I system from said nodes and said interconnecting networking devices, said additional connectivity information, and said network relationships,
  - wherein said discovering, said collecting, said determining and said generating are all automatically implemented by said ANTD system.

10. The ANTD system of claim 9, wherein said data collection algorithm further comprises code for determining inter-connection details between said first and said second C&I systems without any additional inputs from an end user.

11. The ANTD system of claim 9, said data collection algorithm further comprising code for protecting confidential or proprietary data to exclude intellectual property data or trade secrets using an exclusion list.

12. The ANTD system of claim 9, said data collection algorithm further comprising code for upon choosing a selected node from said nodes, displaying related information of said selected node including an object type, model number, port number where said selected node is connected to, and maintenance records for said selected node.

13. The ANTD system of claim 9, said data collection algorithm further comprising code for a search option to enable a user to use said search option for locating one particular node of said nodes.

14. The ANTD system of claim 9, said data collection algorithm further comprising code for selecting a first node from said nodes in said network topology diagram, and responsive to said selecting switching to a physical view to determine where said first node is physically located.

15. The ANTD system of claim 9, said data collection algorithm further comprising code for selecting a first node from said nodes in said network topology diagram, and responsive to said selecting switching to logical view to see a logical association of said first node.

16. The ANTD system of claim 9, said data collection algorithm further comprising code said network topology diagram providing different representations for different network topologies present in said IF C&I system.

* * * * *